Unites States Patent [19]

Quercy

[11] Patent Number: 4,551,060

[45] Date of Patent: Nov. 5, 1985

[54] DEVICE FOR RAISING VARIOUS LOADS, PARTICULARLY TROLLEYS FOR HANDICAPPED PERSONS, ON VEHICLES

[75] Inventor: Alexandre P. L. Quercy, Boulogne, France

[73] Assignee: Societe Anonyme des Usines Chausson, Asnieres, France

[21] Appl. No.: 440,439

[22] Filed: Nov. 9, 1982

[30] Foreign Application Priority Data

Nov. 13, 1981 [FR] France ................................ 81 21351
Sep. 21, 1982 [FR] France ................................ 82 15848

[51] Int. Cl.⁴ .............................................. B66B 9/20
[52] U.S. Cl. .................................... 414/541; 414/921; 187/9 R
[58] Field of Search ............... 187/9 R; 414/921, 540, 414/541, 543

[56] References Cited

U.S. PATENT DOCUMENTS

| 3,515,294 | 6/1970 | Southward et al. | 414/921 X |
| 3,516,559 | 6/1970 | Walter | 187/9 R |
| 3,710,962 | 1/1973 | Fowler, Jr. | 414/921 X |
| 3,893,576 | 7/1975 | Casady | 414/921 X |
| 4,026,387 | 5/1977 | Abreu | 187/9 R |
| 4,155,587 | 5/1979 | Mitchell | 296/65 R |
| 4,214,849 | 7/1980 | Downing | 414/921 X |
| 4,252,491 | 2/1981 | Hock | 187/9 R X |
| 4,306,634 | 12/1981 | Sangster | 187/9 R |
| 4,353,436 | 10/1982 | Rice et al. | 187/9 R |

FOREIGN PATENT DOCUMENTS

| 551148 | 1/1954 | Canada | 187/9 R |
| 2371188 | 6/1978 | France . | |
| 2420340 | 10/1979 | France . | |
| 2069969 | 9/1981 | United Kingdom . | |

OTHER PUBLICATIONS

"Speedy Wagon: The Road to Independence", Speedy Wagon Sales Corp., P.O. Box 159, St. Charles, Mo. 63301

Primary Examiner—H. Grant Skaggs
Assistant Examiner—Louise S. Heim
Attorney, Agent, or Firm—Browdy and Neimark

[57] ABSTRACT

The device comprises a screw driven by a motor for raising and lowering a nut supporting a pivotally mounted arm onto which is fixed a platform able to pass through an opening of a door, and which is then placed on the vehicle floor. A load, for example a trolley, may be fixed on the platform by an anchoring device.

21 Claims, 5 Drawing Figures 4,551,060

DEVICE FOR RAISING VARIOUS LOADS, PARTICULARLY TROLLEYS FOR HANDICAPPED PERSONS, ON VEHICLES

BACKGROUND OF THE INVENTION

The present invention relates to a new device provided to be mounted on vehicles for enabling to raise various loads, particularly trolleys for handicapped persons.

DISCLOSURE OF THE PRIOR ART

French Pat. No. 77-34913 published under U.S. Pat. No. 2,371,188 has taught a device which comprises two frames pivotally connected together, one of the frames being carried by an upstanding tube which may be moved by a screw-jack and the other frame comprising a securing means to connect it to a vehicle seat provided to be carried by the foldable body of a trolley for handicapped persons.

British Pat. No. 2,069,969 shows a plurality of pivotally mounted plates, one of the plates being mounted on an upstanding guide with respect to which it can slide under actuation of jack means while the other plate comprises fixation and articulation fingers which may be engaged into the sockets of a seat provided to be positioned either within a vehicle or on a rolling frame of a trolley for handicapped persons.

U.S. Pat. No. 4,155,587 describes also a movable vehicle seat for handicapped persons which is mounted on a frame sliding under actuation of a cylinder, this frame being itself carried by one side of two pivotally mounted bodies and on an upstanding post secured within the vehicle. A cylinder makes the pivotally mounted frames to pivot for moving them from the inside of the vehicle towards the outside of the vehicle, and reciprocally.

U.S. Pat. No. 4,026,387 describes a platform which is pivotally mounted at a single point or location for swinging through about 90° from a position in which the platform is within the vehicle to a position at right angle thereto. The pivot of the platform is on the end of a shaft which may be raised and lowered.

French Pat. No. 79-07373 published under U.S. Pat. No. 2,420,340 relates to a vehicle for handicapped persons which comprises a body provided with rollers; this body is provided to carry means for raising a supporting structure, for example a seat which may also pivot with respect to the body.

The device according to the invention does not need to be fitted with a particular type of armchair and it can also be used for persons having a small mobility who otherwise could not come in or out of a vehicle.

The device of the invention makes also possible to handle various loads and, moreover, it can easily be hidden when it is not used.

SUMMARY OF THE INVENTION

According to the invention, the raising device for raising various loads, particularly trolleys for handicapped persons, on vehicles, comprises a jack mounted near a door opening of the vehicle for an upstanding displacement of a part provided for supporting an arm pivotally mounted at least in two parts and having a free end on which is mounted a platform.

These and other objects and features of this invention will be better understood and appreciated from the following detailed description of embodiments thereof, selected for purposes of illustration and shown in the accompanying drawings.

DESCRIPTION OF THE PREFERRED EMBODIMENTS

Figure 1A:
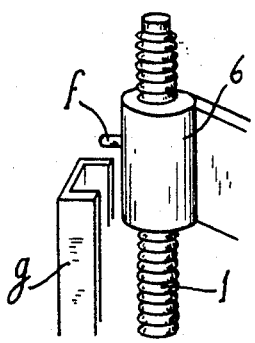
FIG. 1a diagrammatically shows a detail of FIG. 1.

With reference to the drawings, the device comprises a screw 1 mounted, on a side panel A of the vehicle, by a top bearing 2 and, on the floor, by an end bearing 3. The screw 1 is rotated by an electric motor-reducing means 4 through bevel gear 5. A nut 6 fixed on an articulated support 7 formed with two arms pivotally mounted together is engaged on the screw 1. The nut 6 can rotate only at the upper part of the screw because of guiding means 8, made for example by a groove g followed by a finger f as diagrammatically shown in FIG. 1a.

At free end of one of the arms of the articulated support 7 is mounted a platform 9 provided with rocking edges 10 and an anchoring means 11. Mounting of the platform on the arm is made through a rotatable connecting means 12 and a cylindrical rod 13 enabling a rotation of the platform relatively to the articulated support and a lowering of the articulated support when the platform rests on the ground. The movement of the articulated support with respect to the body of the vehicle and the platform relatively to the articulated support are limited by stops (not shown).

Lastly, the movement of the platform 9 is guided by two fingers 14 fixed on the platform and moving in a rail 15 fixed to the floor.

A foldable hand-rail 16 permits a person having a reduced mobility to maintain himself on the platform upon coming in the vehicle.

The assembly made by the screw 1, the nut 6, the motor-reducing means 3 is encased within a box 18 which is advantageously provided with a hole 19 for passing a crank 17 controlling the bevel gear 5 and thus the screw 1, in case the motor-reducing means 4 is out of order.

Figure 1:
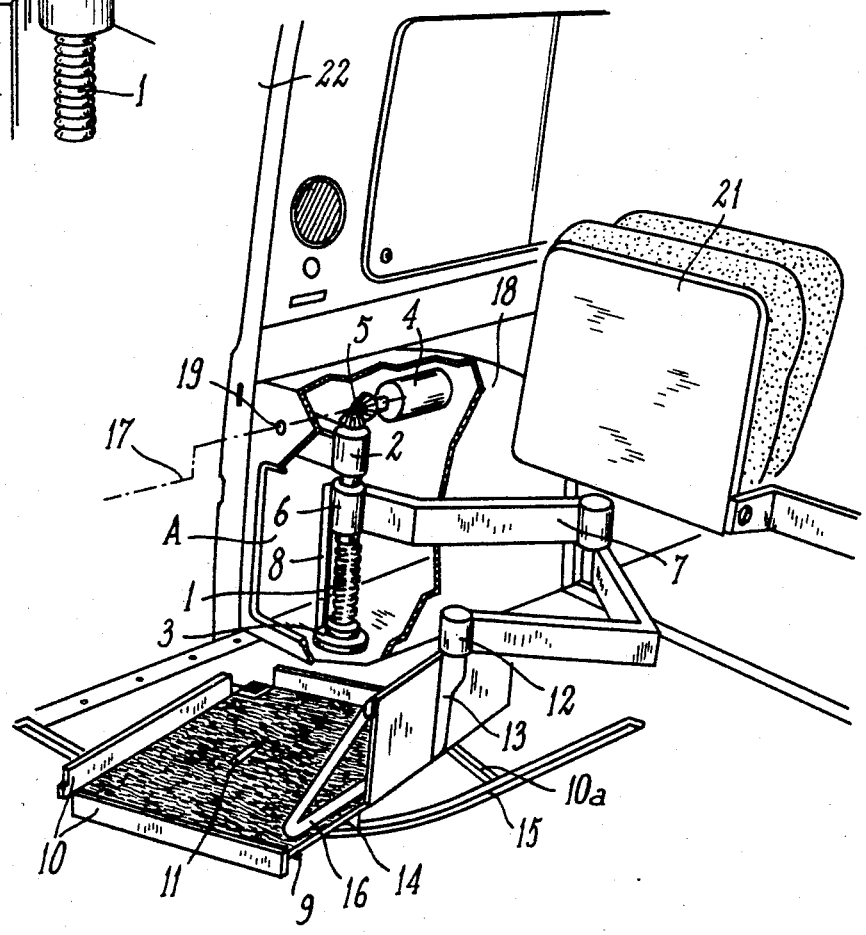
FIG. 1 is a partly broken away diagrammatic perspective view of the device of the invention.
Figure 2:
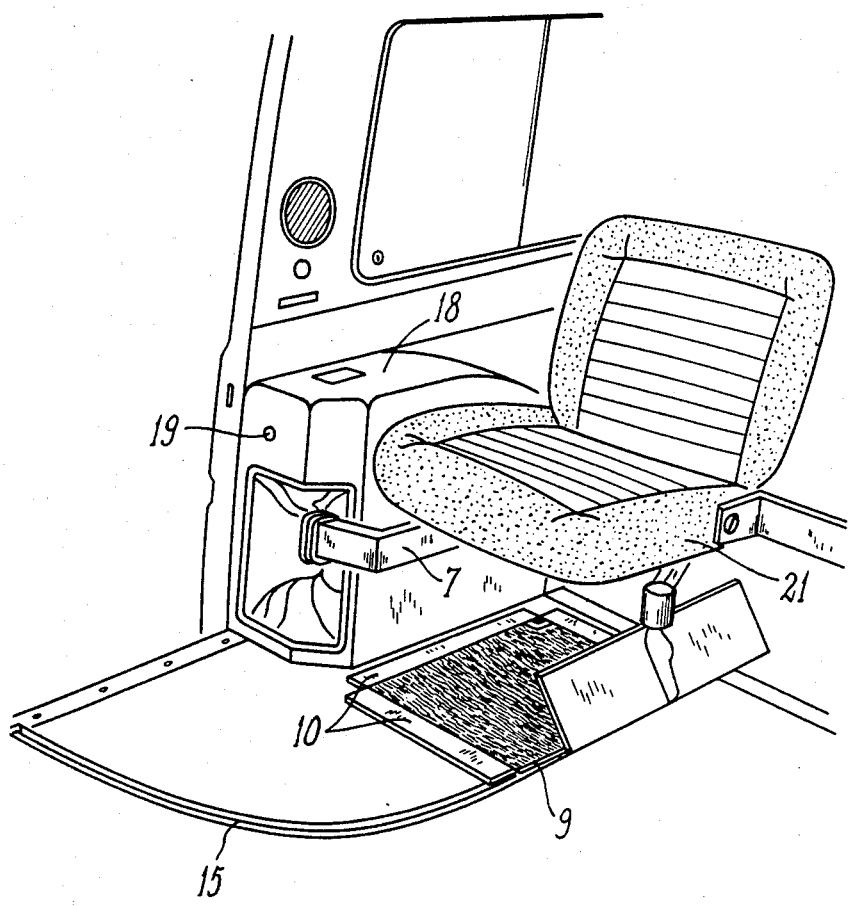
FIG. 2 is a perspective view similar to FIG. 1 when the device is hidden.

As shown in FIG. 2, in the hidden position of the device, the articulated support 7 is under the seat body 21 of a foldable seat which can be raised as shown in FIG. 1. In this position, the platform 9 bears on the vehicle floor, the rocking edges 10 being placed flat or possibly inserted within a trap means 10a provided in the vehicle floor.

When the raising device is to be used, the motor-reducing means 4 is activated so that the nut 6 is brought in the upper position shown in FIG. 1. This has for its effect to raise the platform 9. The nut 6 is then made to pivot in the direction for which the platform 9 is brought at the exterior of the opening of the door 22. The motor-reducing means 4 is again activated in order to lower the platform down to the ground, which permits to position a load on the platform, for example a trolley for an handicapped person. This trolley is secured by means of the anchoring device 11, and the rocking edges 10 are raised so to prevent any displacement of the trolley or any other load placed on the platform. The motor-reducing means 4 is then again activated so that the articulated support 7 raises the load up to above the floor of the vehicle to enable engagement of the guiding fingers 14 in the rail 15.

Although not shown, the rocking edges 10 of the platform 9 are provided with locking means for maintaining the rocking edges 10 in a raised position. These locking means comprise position detectors, for example electric micro-contacts or micro-switches which prevent any actuation of the motor-reducing means 4 as long as they are not in a raised position while the platform is out of the vehicle. Other safety means of a known type and similar to the above micro-contacts or micro-switches are also provided for preventing the vehicle to start when the platform is out of the vehicle, or for preventing actuation of the device if the parking brake of the vehicle is not pressed.

Figure 3:
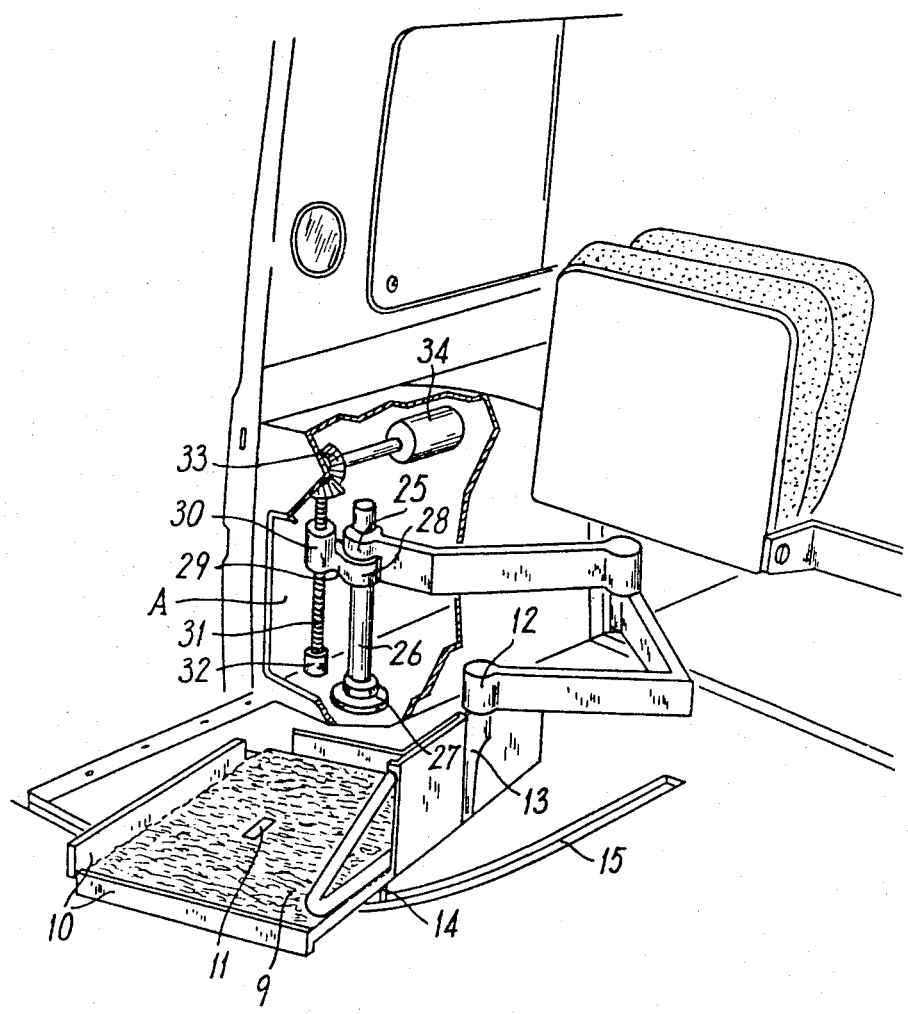
FIG. 3 is a partly broken away diagrammatic perspective view of the raising device according to a variant of embodiment.
Figure 4:
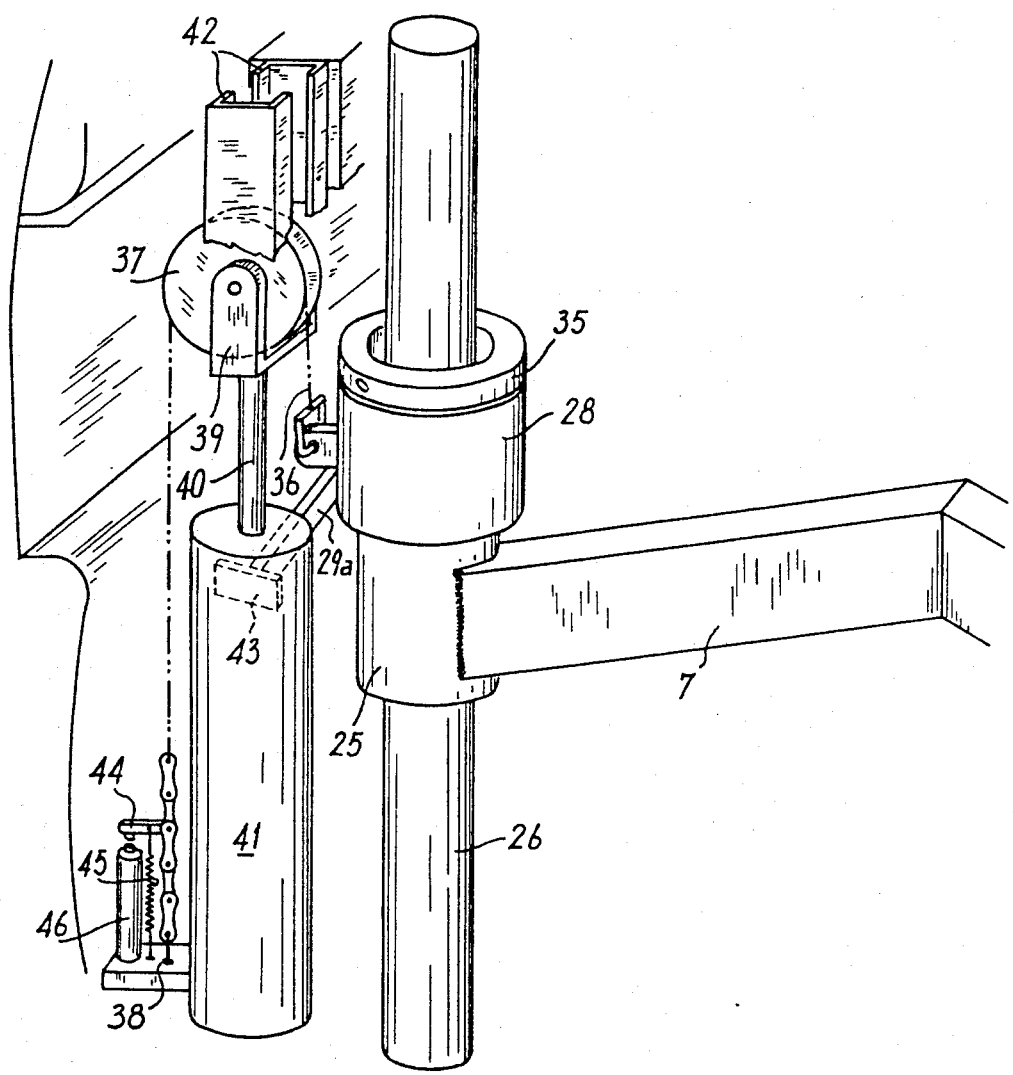
FIG. 4 is an enlarged diagrammatic perspective view of another variant of embodiment.

According to the variants of FIGS. 3 and 4, the articulated support 7 is provided at the end thereof opposite the end supporting the platform 9 with a sleeve 25 which is in engagement with a guiding post 26 fixed through a base plate 27 to the vehicle floor near a side panel A.

Although not shown, a second base plate similar to the base plate 27 can be mounted on top of the post 26 for connecting it to a framework reinforcement.

In FIG. 3, the sleeve 25 rests on a socket 28 connected through a bracket 29 to a nut 30 mounted on a screw 31 which rests in an abutting bearing 32. The screw 31 is connected through a bevel gear 33 to a motor-reducing means 34.

In the present embodiment, the motor-reducing means 34, which can, for example, be a motor for a windscreen wiper, makes the screw 31 to rotate in either direction which has for its effect to lower or raise the socket 28 which is guided along the post 26. The sleeve 25 which bears on the socket 28 follows the sliding movement of the socket 28, and the same movement is consequently applied to the articulated support 7 and to the platform 9.

Since no pivoting torque is applied to the nut 30 or to the screw 31, the power for moving the load of the articulated support 7 and platform 9 is considerably reduced. Besides, the articulated support 7 may very easily pivot around the post 26 while bearing on the socket 28.

FIG. 4 illustrates a variant of embodiment according to which the sleeve 25 is provided at its upper part with a collar 35 beneath which is placed the socket 28. The collar 35 is, for example, added on the sleeve 25 which facilitates mounting of the various parts.

In this embodiment, the socket 28 is connected to a chain 36 which is mounted around a pulley 37 and secured to an anchoring part 38 fixed to the floor of the vehicle. The pulley 37 is carried by a yoke 39 mounted on the rod 40 of a jack 41. The jack 41 is advantageously an electric jack.

U-shaped parts 42 are fixed on the sides of the vehicle for guiding the yoke 39 while preventing the yoke 39 from pivoting. Moreover, the socket 28 is itself guided by a bracket 29a and a guiding skid 43 so not to pivot with respect to the jack when said sleeve 25 rotates around the post 26.

As in the embodiment of FIG. 1, the guiding function provided by the post 26 is separated from the raising function provided by the jack 41, whereby the effort to be carried into effect for handling the device is considerably reduced.

The chain 36 comprises on the portion thereof which is fixed to the anchoring part 38 a lever 44 connected to a pre-loaded spring 45 which, in the present example, works as a pulling spring. The spring 45 is for example also secured to the anchoring part 38.

The lever 44 is placed opposite an electric switch 46 controlling the control circuit of the jack 41. The assembly made of the lever 44, spring 45 and switch 46 constitutes a tension detector of the chain 36. In case of an accident, upon lowering of the platform, for example, if this platform will rest by mistake on an article, it results therefrom that the chain 36 is slackened, which is immediately detected by the tension detector and causes stoppage of actuation of the jack 41 and therefrom stoppage of lowering of the platform 9.

Because modifications may be made of this invention without departing from its spirit, it is not intended that the breath of this invention be limited to the specific embodiments illustrated and described. Rather, it is intended that the scope of this invention be determined by the appended claims and their equivalents.

I claim:

1. A lift assembly for a vehicle having a vehicle floor and a vehicle body with a door opening, comprising jack means mounted within the vehicle body in vicinity of the door opening, an articulated support parallel to the vehicle floor, said articulated support comprising two bent arms pivotally mounted together and having one end and a free end, with said one end being operatively connected to said jack means and adapted to be driven thereby, said free end of the articulated support pivotally supporting a platform, curved rail means being provided in the vehicle floor for arcuately guiding the platform in the vehicle.

2. An assembly according to claim 1, further comprising motor reducing means, and wherein the jack means comprises a screw rotated by the motor-reducing means, the articulated support having a supporting part comprising a nut cooperating with guiding means for rotation only when said nut is at upper position of the screw.

3. An assembly according to claim 1, wherein the platform is provided with at least one rocking edge.

4. An assembly according to claim 1, wherein the platform is provided with anchoring means.

5. An assembly according to claim 1, wherein the platform is provided with a foldable hand-rail.

6. An assembly according to claim 3, wherein both the articulated support and the platform carried by said support are placed beneath a seat having a foldable seat body when in a rest position for which the at least one rocking edge of the platform is placed flat.

7. An assembly according to claim 1, wherein both the articulated support and the platform carried by said support are placed beneath a seat having a foldable seat body when in a rest position for which the at least one rocking edge of the platform is engaged in trap means in the vehicle floor.

8. An assembly according to claim 1, wherein the rail means comprise a rail rigidly connected to the vehicle and finger means connected to the platform.

9. An assembly according to claim 1, further comprising a crank fittable onto the jack means for controlling raise and fall of the articulated support.

10. An assembly according to claim 1, further comprising safety means preventing actuation of the assembly.

11. An assembly according to claim 1, wherein the jack means is separated from a guiding sleeve for guiding the articulated support, said jack means being connected to said guiding sleeve by means providing a movement in an axial direction.

12. An assembly according to claim 11, wherein the guiding sleeve is pivotally mounted on a guiding post anchored inside the vehicle, said means providing a movement in an axial direction comprising a socket axially guided and connected to the jack means, with said guiding sleeve, being carried by said socket.

13. An assembly according to claim 12, comprising a bracket for axially guiding the socket, said bracket being fixely connected to a nut cooperating with a screw of the jack means, said screw being mounted parallel to the guiding post.

14. An assembly according to claim 13, wherein the screw of the jack means is carried by an abutment bearing and driven through a motor-reducing means by a bevel gear.

15. A lift assembly for a vehicle having anchoring means and a door opening, comprising jack means mounted in the vehicle in proximity of the door opening, an articulated support comprising two arms pivotably mounted together, said articulated support having one end and a free end, with said one end being operatively connected to said jack means and adapted to be driven thereby, a platform pivotally mounted at the free end of the articulated support, and rail means for guiding the platform in the vehicle, wherein the jack means is separated from a guiding sleeve for guiding the articulated support, said jack means being connected to said guiding sleeve by means providing a movement along an axial direction, and wherein the jack comprises a rod for controlling a pulley, a chain being mounted around the pulley and being connected both to an anchoring means provided in the vehicle and to a socket carrying the guiding sleeve.

16. An assembly according to claim 15, comprising means for guiding the pulley, a socket carrying the sleeve being guided by a bracket and a skid.

17. An assembly according to claim 16, wherein the socket is mounted above a sleeve on the guiding post.

18. An assembly according to claim 17, wherein the socket is in engagement with the sleeve, said sleeve further having a top provided with a bearing collar.

19. An assembly according to claim 1, wherein the jack means is an electric jack.

20. An assembly according to claim 12, wherein the guiding post is maintained at two ends thereof.

21. An assembly according to claim 15, comprising a tension detector on the chain, control means activated by the detector being further provided for controlling the jack means.

* * * * *